Sept. 26, 1950 N. S. HULSTEIN 2,523,660
ELECTROMAGNETIC CAMERA SHUTTER SYNCHRONIZER
Filed May 26, 1945 2 Sheets-Sheet 1
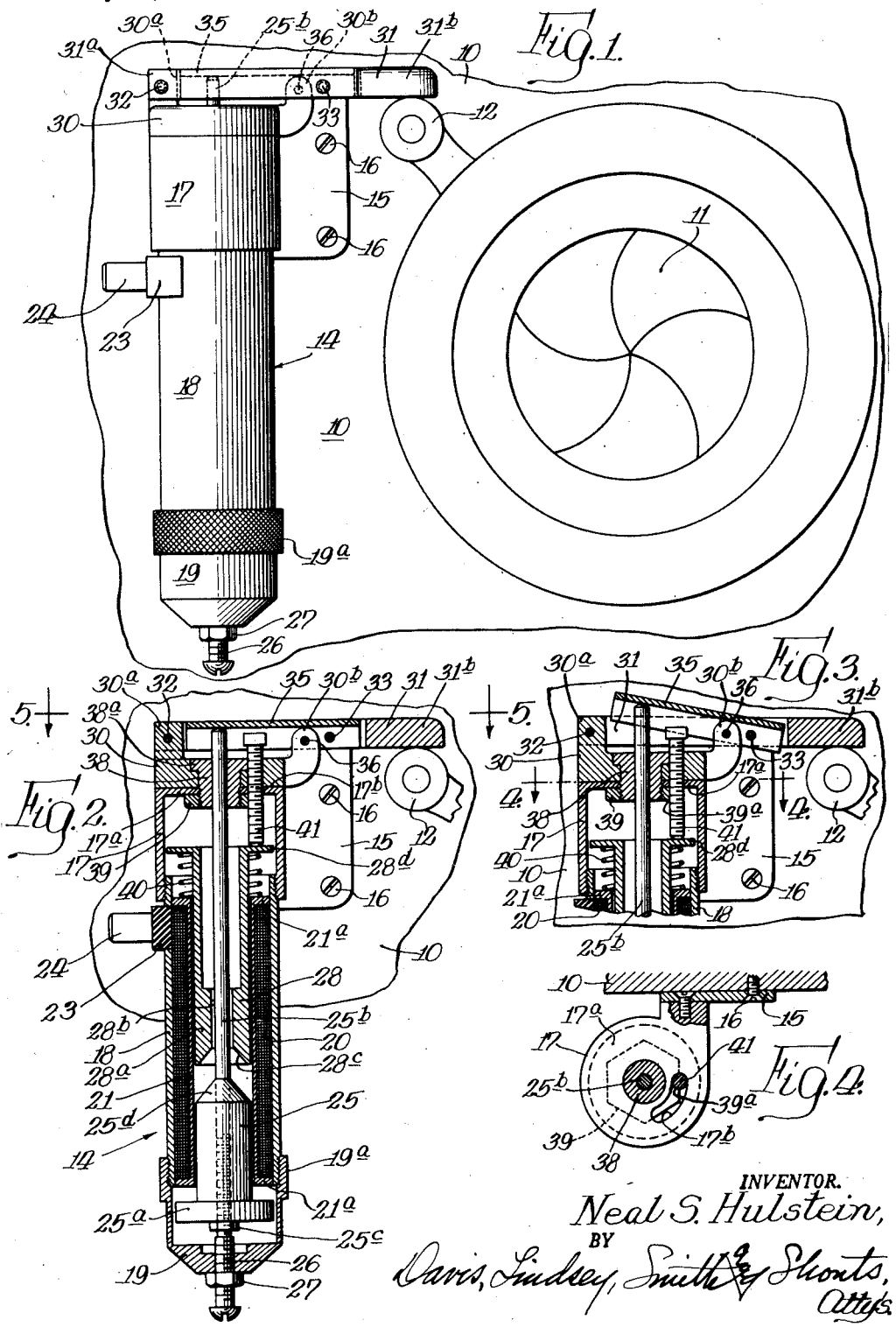
INVENTOR.
Neal S. Hulstein,
BY
Davis, Lindsey, Smith & Shonts,
Attys.

Sept. 26, 1950 N. S. HULSTEIN 2,523,660
ELECTROMAGNETIC CAMERA SHUTTER SYNCHRONIZER
Filed May 26, 1945 2 Sheets-Sheet 2
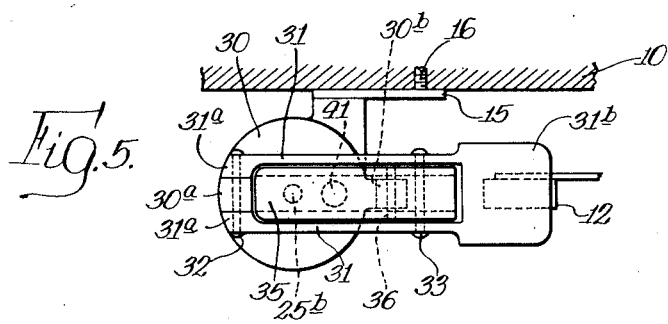
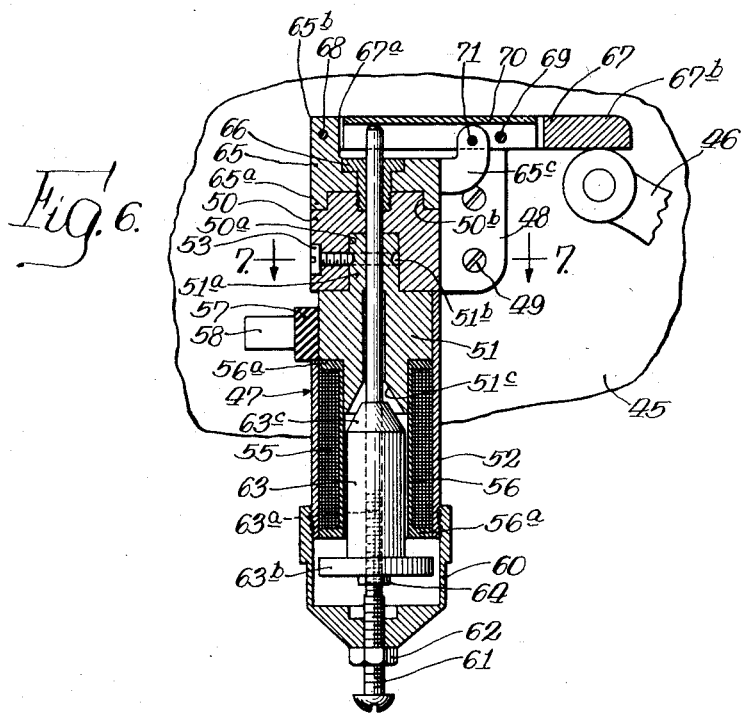
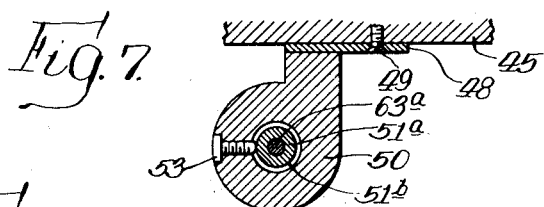
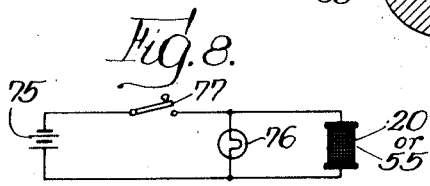
INVENTOR.
Neal S. Hulstein,
BY
Davis, Lindsey, Smith & Shonts,
Attys.

Patented Sept. 26, 1950

2,523,660

UNITED STATES PATENT OFFICE 2,523,660

ELECTROMAGNETIC CAMERA SHUTTER SYNCHRONIZER

Neal S. Hulstein, Denver, Colo., assignor to Heiland Research Corporation, Denver, Colo., a corporation of Colorado Application May 26, 1945, Serial No. 596,025

7 Claims. (Cl. 95—11.5)

This invention relates to a shutter operating device and its purpose is to provide improved apparatus for synchronizing the operation of the shutter of a photographic camera with the operation of a flashlight bulb employed therewith, so that the mechanism of the shutter will coincide with the greatest intensity of light produced by the flash of the bulb, and capable of use, also, for effecting remote actuation of a camera shutter.

It is well known that there is a lag between the closing of an electric circuit to actuate a flashlight bulb and the instant when the maximum intensity of light produced by the flash of the bulb occurs, and, also, that there is a lag in time between the start of the operation of the shutter mechanism of a camera and the point where the shutter has its maximum opening. The periods of lag for both the flashlight bulb and the shutter may vary with different designs and manufacturers, and to obtain the best results under all conditions, it is desirable to provide means for adjusting the operation of the two devices so that their maximum effects will be obtained simultaneously. Shutter operating devices have heretofore been provided which permit some adjustment of the operation of the shutter in its relation to the actuation of the flashlight bulb but these prior devices have not been satisfactory in all respects. It is desirable, in order to render a wide variety of flashlight bulbs adaptable to use with different makes and forms of shutter mechanism, to provide an adjustment of the point from which the movement of the shutter operating device starts when the circuit of the flashlight bulb is energized and also an adjustment of the duration of the movement of the device in the shutter operating direction. The prior shutter operating devices have accomplished the first of these functions efficiently but the means which have heretofore been provided for effecting an adjustment of the end of the working stroke of the operating device have required the disassembly of a substantial portion of the device in order to change the relative positions of certain parts, thus necessitating delays in the operation of the apparatus and requiring a reassembly of the device to test the result of the adjustment. Prior devices have also been unsatisfactory in that the simple levers used to transmit motion from the operating device to the shutter have required too much power for their operation and have necessitated too wide a separation of the shutter and the shutter operating device.

The principal object of the present invention is to provide a shutter operating device in which improved means are provided for adjusting the point in the movement of the apparatus where the actuation of the shutter ceases, so that the limit of opening of the shutter may be varied at the will of the operator, without disassembling the device. A further object of the invention is to provide a shutter operating device, for synchronizing the operation of the shutter of a camera with the actuation of a flashlight bulb, in which improved means are provided for varying the range of movement of the operating mechanism of the device by adjusting both the point at which the movement starts and the point at which it ends through the operation of adjusting members which are accessible and operable while the device is completely assembled. A further object is to provide a shutter operating device comprising improved lever mechanism for imparting the motion of the device to the trip lever of the camera shutter, whereby the device may be located in proximity to the trip lever and may be operated with a minimum expenditure of energy. A further object of the invention is to provide a shutter operating device having lever mechanism which is arranged to actuate the shutter and which may be readily moved to an inoperative position when desired. A further object of the invention is to provide shutter operating mechanism comprising an electromagnet and a reciprocating plunger which are capable of being adjusted angularly with respect to the remaining parts of the device and which may be readily removed for purposes of replacement or repair. Another object is to provide a shutter operating device which may be readily assembled and disassembled. Other objects relate to various features of construction and arrangement which will appear more fully hereinafter.

The nature of the invention will be understood from the following specification taken with the accompanying drawings in which two embodiments are illustrated.

In the drawings:

Figure 1 shows a partial front elevation of the lens board and shutter of a photographic camera having associated therewith one form of the improved shutter operating device of the present invention;

Fig. 2 shows a vertical axial section through the shutter operating device illustrated in Fig. 1 with the lever operating plunger in its retracted position;

Fig. 3 shows a partial vertical section similar to that of Fig. 2, illustrating the plunger of the electromagnet in its actuated position and with the trip lever of the camera in its operated position;

Fig. 4 shows a sectional view taken on the line 4—4 of Fig. 3;

Fig. 5 shows a sectional view taken on the line 5—5 of Fig. 2, illustrating a top plan view of the shutter operating device;

Fig. 6 is a sectional view similar to that of Fig. 2, showing a modified form of the invention;

Fig. 7 shows a sectional view taken on the line 7—7 of Fig. 6; and

Fig. 8 is a diagrammatic view showing the circuit connections of the flashlight bulb and the electromagnet of the shutter operating device when using either form of the invention.

In Fig. 1, there is shown the lens board 10 of a photographic camera having a shutter 11 which is adapted to be operated by a trip lever or trigger 12. This trigger may be manually operated but, when the present invention is employed, it is operated automatically, when the circuit of the flashlight bulb is closed, through the actuation of the shutter operating device 14 which may be detachably secured to the lens board 10, in proximity to the shutter, by a supporting plate or bracket 15 engaged by the screws 16. The plate 15 has detachably secured thereto an inverted cup-shaped body member 17 which is internally threaded at its lower end for detachable engagement with the upper threaded extremity of a barrel 18. This barrel is threaded at its lower end for engagement by a detached cap member 19 which has a knurled portion 19ª to be gripped by the fingers of the operator. An electromagnet or solenoid 20 is mounted in the barrel 18 around a hollow spool 21 formed of non-magnetic material, such as brass, and having radial end flanges 21ª which fit within the barrel. The terminals of the winding of this solenoid are led through an insulating block 23, mounted in an opening at one side of the barrel, to a pair of terminal posts 24 which are adapted to permit the solenoid to be plugged into the circuit of the flashlight bulb in parallel therewith.

A cylindrical plunger 25 of magnetizable material is reciprocably mounted within the lower end of the electromagnet 20 and it is provided at its lower end with an outwardly extending annular flange 25ª which underlies the lower end of the electromagnet and which is of lesser diameter than the inner chamber of the cap member 19 by which it is enclosed. This plunger has an axially located stem 25ᵇ in threaded engagement therewith which projects below the body portion of the plunger where it is engaged by a lock nut 25ᶜ. The upper limit of movement of the plunger is determined by the engagement of the flange 25ª with the lower end of the electromagnet and the point where this occurs may be properly adjusted when the apparatus is assembled by releasing the lock nut and moving the body portion of the plunger on its stem. The downward movement of the plunger is limited by the engagement of the lower end of the stem 25ᵇ with a stop screw 26 which threadedly engages the lower end of the cap member 19 and which is held in adjusted position by a lock nut 27. The stop screw 26 may be adjusted to determine the lower position which the plunger assumes in response to the spring actuated shutter lever when the electromagnet 20 is deenergized.

The stem 25ᵇ of the plunger 25 extends upwardly through the electromagnet and through an adjusting sleeve 28 of magnetizable material which is adjustably mounted within the hollow core 21. The sleeve 28 is of substantial thickness at its lower end, as shown at 28ª, and this part is provided with a bore 28ᵇ of reduced diameter through which the stem 25ᵇ passes. At its lower extremity, the adjusting sleeve 28 is provided with a beveled surface 28ᶜ, in the form of a truncated cone, which is adapted to surround the corresponding inclined annular surface 25ᵈ formed upon the upper end of the body portion of the plunger 25 when the plunger 25 is moved upwardly.

The stem 25ᵇ of the plunger is adapted to actuate the trip lever or trigger 12 of the shutter mechanism through the agency of the lever mechanism shown particularly in Figs. 2, 3 and 5. This lever mechanism is mounted upon a head 30 which is positioned upon the upper end of the body member 17 and which has an upwardly extending lug 30ª which is embraced by and pivotally connected to the free end of the arms 31ª of a bifurcated or double armed lever 31 through the agency of a pivot pin 32, as shown particularly in Fig. 5. Adjacent their other ends these lever arms 31ª are pivotally connected by another pin 33 with a second lever 35 of channel-shaped cross section which is mounted between them and pivoted at an intermediate point, by means of the pin 36, upon a lug 30ᵇ which extends upwardly from the head 30 and terminates between the side walls of the lever 35. The body portion of the lever 31 is extended beyond the pivot pin 33 as shown at 31ᵇ and contacts on its under side with the end of the trip lever or trigger 12 by which the shutter is operated.

The free end of the lever 35 located on the opposite side of the pin 36 from the pin 33 extends over the upper end of the stem or rod 25ᵇ of the plunger and when this plunger moves upwardly the lever 35 is rocked about its stationary pivot 36, thereby causing the downward movement of the pivot pin 33 and a corresponding depression of the extension 31ᵇ of the lever 31, thereby operating the trigger 12 to actuate the shutter mechanism. By means of this lever arrangement, a larger stroke of the plunger may be employed for a given movement of the actuating end of the trip lever, thus giving better adjustability at the beginning and at the end of the stroke with consequent better timing while also permitting the solenoid 20 to be designed to consume a minimum of electrical energy in order to effect the operation of the shutter. The lever arrangement also makes the assembly compact so that the shutter operating mechanism may be located in close proximity to the shutter.

The head 30 is mounted to rotate on the body member 17 through the agency of an attaching member 38 which extends through an aperture in the member 30 and has a flange 38ª overlying a recessed shoulder formed in the head 30. This member 38 is threaded at its lower end and is engaged beneath the upper wall 17ª of the hollow body member 17 by a nut 39 which is adjusted so that the head 30 is held frictionally in place but may be rotated from the position shown in the drawings when it is desired to operate the shutter of the camera without the use of the synchronizing device.

In order to vary the timing of the device without any change in the magnetic force required to trip the shutter, the magnetizable adjusting sleeve 28 is mounted for vertical adjustment within the upper part of the electromagnet 20. For this purpose, it is provided at its upper end with a laterally extending flange 28ᵈ which contacts the upper end of a coiled spring 40 seated at its lower end on the upper end 21ª of the spool 21. This spring normally holds the adjusting sleeve in a position determined by the adjustable stop screw 41 which engages the upper side of the flange 28ᵈ and which may be manipulated when the device is fully assembled, to vary the position of the sleeve 28, thus allowing the operator to observe quickly the effect of any adjustment. This adjusting screw threadedly engages the cap member 30 and passes through an arcuate slot 17ᵇ formed in the upper wall of the body member. It also engages a notch 39ª in the nut 39 so that, when it is in position, the nut 39 is held against rotation. The slot 17ᵇ permits angular adjustment of the head 30 on the body member 17 when it is desired to move the lever mechanism out of the path of movement of the trip lever 12. By this adjustment, the part of the core of the electromagnet represented by the sleeve 28 may be adjusted downwardly to a lower limit determined by the engagement of the flange 28ᵈ with the upper end of the barrel 18. Since the upper limit of movement of the plunger 25 is determined by the engagement of the flange 25ª with the electromagnet, it will be apparent that the gap between the adjacent tapered ends of the parts 25 and 28 must be sufficient to allow for the maximum downward adjustment of the sleeve 28.

With this arrangement of the construction shown in Figs. 1 to 5, inclusive, it will be apparent that a substantial range of adjustment of the shutter operating device may be obtained in order to vary the point at which the operating stroke of the plunger 25 begins and also to vary the timing brought about by adjusting the position of the sleeve 28, which makes it possible not only to vary the period of operation of the plunger before the trip lever of the shutter mechanism is actuated but also the duration of that actuation by the movement of the plunger. By adjusting the screw 26, the plunger 25 may be caused to assume the desired lower position so that an upward movement of a predetermined amount from that position will be required to effect the initial operation of the trip lever 12 and by adjusting the sleeve 28 vertically the timing of the upward stroke of the plunger may be varied to adapt the operation of the shutter to the characteristics of the flashlight bulb being employed. The extreme upward movement of the plunger 25 is limited independently of the adjusting sleeve 28 by the engagement of the flange 25ª of the plunger with the lower end flange 21ª of the spool 21 of the electromagnet.

In Fig. 6 of the drawings, there is shown the adaptation of the improved lever mechanism to use with a form of shutter operating device which has heretofore been employed. In this modified form of the invention, the lens board 45 of the camera has located in proximity thereto the trip lever 46 of the camera shutter and the shutter operating device 47 is detachably secured to a plate or bracket 48 secured by screws 49 on the lens board. This plate or bracket is detachably secured by screws or the like to the body member 50 which has suspended therefrom a magnetizable block 51 of cylindrical form which is mounted in the upper end of a barrel 52. The block 51 has a reduced portion 51ª which extends upwardly and fits within a cylindrical recess 50ª formed in the lower end of the body member 50. The part 51ª has an annular groove 51ᵇ engaged by the end of a screw 53 which is mounted in the side of the member 50 so that the block 51 and the barrel 52 mounted thereon are capable of being rotated bodily with respect to the body member 50 and bracket 48 and of being readily detached if it be desired to change any part.

The barrel 52 has mounted therein an electromagnet or solenoid 55 wound on a spool 56 having flanges 56ª which fit within the barrel. The terminals of the winding of this electromagnet are brought out through an insulating block 57, mounted on the member 51, to two terminal posts 58 which are adapted to be plugged into the circuit of the flashlight bulb so that when this circuit is closed and the bulb actuated, the electromagnet is at the same time energized to effect the operation of the shutter of the camera. By turning the block 51 with respect to the body member 50, the circuit connections may be located so that they will not interfere with other parts of the device.

The barrel 52 is threaded at its lower end for detachable engagement by a cap member 60 which has adjustably mounted therein a stop screw 61 adapted to be held in place by a lock nut 62. This screw 61 serves as a stop for limiting the downward movement of a plunger 63, formed of magnetizable material, which is mounted to reciprocate within the electromagnet 55. This plunger has a stem 63ª in threaded engagement therewith and this stem projects below the lower end of the plunger 63 where it is engaged by a lock nut 64. When the plunger moves to its lower or retracted position in response to the return movement of the spring actuated shutter lever 46, the lower end of the stem 63ª seats upon the upper end of the stop screw 61. The body portion of the plunger is provided with an annular flange 63ᵇ at its lower end which extends outwardly within the cap member 60 below the lower end of the electromagnet. The plunger, which is adapted to actuate the trip lever 46 of the shutter mechanism, as hereinafter described, is limited in its upward movement by the engagement of the annular flange 63ᵇ on the lower end of the body of the plunger with the lower end of the electromagnet and the point where this occurs may be varied by releasing the lock nut 64 and adjusting the position of the plunger on its stem. When the plunger moves upwardly in response to the energization of the electromagnet, its tapered upper end 63ᶜ enters the tapered recess 51ᶜ formed in the lower end of the block 51, thus tending to increase the attractive force exerted by the electromagnet on the plunger.

A head 65 is rotatably mounted upon the body 50, being provided with an annular flange 65ª which extends downwardly over the upper cylindrical extension 50ᵇ of the body member 50. A connecting member 66 extends through the head 65 and threadedly engages an internally threaded recess formed in the upper end of the member 50, thus holding the member 65 in position while allowing it to be rotated about its vertical axis.

The stem 63$^a$ extends upwardly through the block 51, the body member 50, and the connecting member 66 and its upper end is adapted to engage and operate the lever mechanism by which the trip lever 46 is actuated. This lever mechanism comprises a lever 67 which is bifurcated to form arms 67$^a$ pivoted at their free ends on a pin 68 carried by the lug 65$^b$ which extends upwardly from the head 65. This lever is in turn pivoted by a pin 69 to a shorter lever 70 of channel-shaped cross section which is pivoted on a pin 71 carried by the lug 65$^c$ extending upwardly from the head 65, as in the form of lever mechanism previously described. When the electromagnet 55 is energized to move the plunger 63 upwardly, from the normal position shown in Fig. 6, the stem 63$^a$ actuates the free end of the lever 70, which rests upon the upper end of the stem, thus depressing the pivot pin 69 and causing a corresponding downward movement of the extremity 67$^b$ of the body portion of the lever 67 which overlies the end of the trip lever 46. In this way, the shutter may be operated simultaneously with the energization of the electromagnet which is included in the circuit with the flashlight bulb. By adjusting the position of the stop screw 61, the starting point of the actuating movement of the plunger 63 may be regulated as desired and the upper limit of movement of the plunger is adjusted, as described above, by varying the position of the plunger 63 on its stem 63$^a$.

In Fig. 8 there is shown diagrammatically the electrical connections of the flashlight bulb and the solenoid of the operating device. A battery 75 is connected in parallel with the flashlight bulb 76 and the solenoid 20 or 55 through an operating switch 77 which is usually mounted on the battery case.

Although certain forms of the invention have been shown and described by way of illustration, it will be understood that it may be constructed in various other embodiments which come within the scope of the appended claims.

I claim:

1. A device for operating in timed relation a flashlight and a photographic shutter having an actuating member, comprising an electromagnet adapted to be connected in the circuit of said flashlight, a plunger arranged to be actuated when said electromagnet is energized to operate said actuating member, an adjustable member free of said plunger for controlling the movement of said plunger in one direction, an adjustable part for determining the normal position of said adjustable member, and resilient means for holding said adjustable member in engagement with said adjustable part.

2. A device for operating in timed relation a flashlight and a photographic shutter having an actuating member, comprising an electromagnet adapted to be connected in the circuit of said flashlight, a plunger mounted to reciprocate within said electromagnet, said plunger occupying normally a retracted position and being movable to an actuated position to operate said actuating member when said electromagnet is energized, and a magnetizable member adjustable within said electromagnet to control the movement of said plunger and thereby determine said actuated position.

3. A device for operating in timed relation a flashlight and a photographic shutter having an actuating member, comprising an electromagnet adapted to be connected in the circuit of said flashlight, a plunger mounted to reciprocate within said electromagnet, said plunger occupying normally a retracted position and being movable to an actuated position to operate said actuating member when said electromagnet is energized, a magnetizable member extending into said electromagnet in alignment with said plunger, an adjustable stop screw engaging said magnetizable member on the side thereof opposite said plunger, and resilient means for holding said magnetizable member in engagement with said stop screw.

4. A device for operating in timed relation a flashlight and a photographic shutter having an actuating member, comprising a stationary body member, an electromagnet carried by said body member and adapted to be connected in the circuit of said flashlight, a plunger adapted to be actuated by said electromagnet when said circuit is energized, a head mounted for angular movement on said body member, and lever mechanism carried by said head and comprising a part adapted to be moved into the path of said actuating member upon rotation of said head to a predetermined position, said lever mechanism being arranged for actuation by said plunger.

5. A device for operating in timed relation a flashlight and a photographic shutter having an actuating member, comprising a plate adapted to be secured to a stationary member adjacent said shutter, a hollow body member carried by said plate, a head mounted on the upper side of said body member, means carried by said head for operating said actuating member, a barrel detachably secured to the under side of said body member, a solenoid mounted in said barrel and having means for forming a connection with the circuit of said flashlight, and a plunger mounted to be moved upwardly by said solenoid when said circuit is energized, said plunger having a stem extending through said body member and arranged to actuate said operating means carried by said head.

6. A device for operating in timed relation a flashlight and a photographic shutter having an actuating member, comprising a plate adapted to be secured to a stationary member adjacent said shutter, a hollow body member carried by said plate, a head mounted on the upper side of said body member, means carried by said head for operating said actuating member, a barrel detachably secured to the under side of said body member, a solenoid mounted in said barrel and having means for forming a connection with the circuit of said solenoid, a plunger mounted to be moved upwardly by said solenoid when said circuit is energized, said plunger having a stem extending through said body member and arranged to actuate said operating means carried by said head, and adjustable means for controlling the upward movement of said plunger.

7. A device for operating in timed relation a flashlight and a photographic shutter having an actuating member, comprising a plate adapted to be secured to a stationary member adjacent said shutter, a hollow body member carried by said plate, a head mounted on the upper side of said body member, means carried by said head for operating said actuating member, a barrel detachably secured to the under side of said body member, a solenoid mounted in said barrel and having means for forming a connection with the circuit of said solenoid, and a plunger adapted normally to assume a retracted position and adapted to move to an actuated position when said solenoid is energized by the closing of said circuit, said plunger having a part extending through said body member to actuate said operating means carried by said head when said plunger is moved to its actuated position.

NEAL S. HULSTEIN.

REFERENCES CITED

The following references are of record in the file of this patent:

UNITED STATES PATENTS

| Number | Name | Date |
|---|---|---|
| 2,161,355 | Jacobson | June 6, 1939 |
| 2,176,573 | Hershberg | Oct. 17, 1939 |
| 2,176,972 | Lindahl | Oct. 23, 1939 |
| 2,271,340 | Jacobson | Jan. 27, 1942 |
| 2,293,477 | Steiner | Aug. 18, 1942 |
| 2,324,075 | Gillon | July 13, 1943 |
| 2,333,776 | Gillon et al. | Nov. 9, 1943 |

FOREIGN PATENTS

| Number | Country | Date |
|---|---|---|
| 880,955 | France | Jan. 11, 1943 |